April 23, 1963 R. E. LOVEJOY 3,087,101

MULTIPLEX RECORDING AND PLAYBACK SYSTEM

Filed June 21, 1960

3 Sheets-Sheet 1

INVENTOR.
REX E. LOVEJOY

BY

Richard K. Macneill
ATTORNEYS

INVENTOR.
REX E. LOVEJOY

BY

ATTORNEYS

INVENTOR.
REX E. LOVEJOY
BY
[signature]
ATTORNEYS

United States Patent Office 3,087,101

Patented Apr. 23, 1963

3,087,101

MULTIPLEX RECORDING AND PLAYBACK SYSTEM

Rex E. Lovejoy, Los Angeles, Calif., assignor, by mesne assignments, to the United States of America as represented by the Secretary of the Navy Filed June 21, 1960, Ser. No. 37,815
10 Claims. (Cl. 318—162)

This invention refers to a multiplex recording and playback system and more particularly to a multiplex recording and playback system for recording and reproducing the positions of a plurality of shafts.

The prior art shaft position recording and reproducing systems utilized multi-track techniques i.e. a separate recording track was used for each shaft position of interest. In systems requiring precise relative position reproduction between a plurality of shafts this technique has disadvantages resulting in severe inaccuracies. The paramount disadvantages in multi-track systems are limited frequency response, relative phase shift upon playback, and inter-modulation between tracks. All of these result in limiting the accuracy of the overall system.

It is thus an object of the present invention to provide a multiplex recording and playback system which simultaneously records on a single track of magnetic tape electrical signals representing the instantaneous angular position of a plurality of shafts.

Another object of the present invention is to accurately reproduce from a single recording track the absolute and relative positions of a plurality of shafts from the playback of a single track tape recording.

A still further object of the present invention is to provide a multiplex tape recording and playback system for recording and reproducing multi-channel electrical phase shift information which utilizes a single recording head and a single recording track.

According to the invention a plurality of phase transducers are coupled to the shafts of interest which convert shaft positions into a plurality of A.C. signals having phase relationships to a reference signal which depend upon the individual shaft positions. Each of these signals, including a reference signal, is coupled to the input of a different gate circuit. The gate circuits are gated by a square wave generator and a plurality of binary counters in sequential order and the outputs of the gate circuits are all recorded on the same recording track. It is necessary that the reference signal be recorded at a higher level than the shaft signals as will be explained below.

Upon playback, the signals are all passed to the inputs of the same number of gates utilized on recording i.e. a separate gate for each shaft position signal and the reference signal. The signals are also utilized to trigger a series of binary counters which are synchronized in time relation through the utilization of the larger amplitude reference signal referred to above. The outputs of the binary counters are then utilized to trigger the playback gate circuits in the same order as the recording gate circuits wer gated. The output of each gate is detected in a separate recycling detector which restores approximately the same shape as the input signal. The outputs of each shaft signal recycling detector are compared with the reference signal recycling detector in a resolver-servo arrangement, each of which will yield a signal corresponding to the shaft position of interest.

It can be seen from the above brief description that the invention may be employed to record and playback other mechanical data than rotational shaft information i.e. any multichannel electric phase shift information can be stored and played back through the utilization of an appropriate transducer. Thus, while the invention will be described with particular reference to shaft information recording and playback since it has particular utility in this application, it is to be understood that the invention is not limited thereto.

Other objects and many of the attendant advantages will become more readily apparent with reference to the following detailed description taken in conjunction with the drawings in which.

Figure 1:
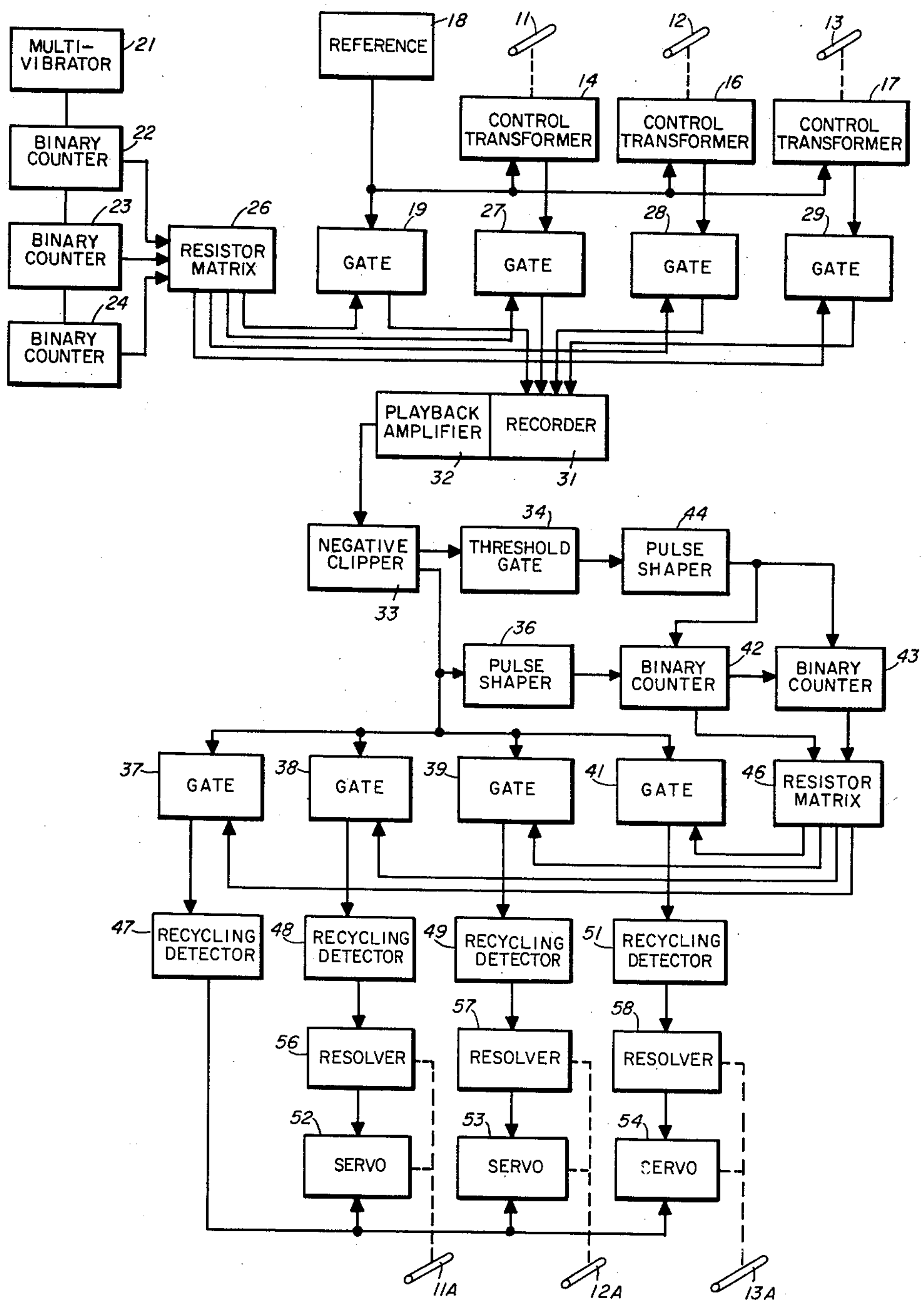
FIG. 1 is a block diagram of the preferred embodiment of the present invention.

Referring now to FIG. 1 there are shown three mechanical shafts 11, 12 and 13, respectively, which are mechanically coupled to control transformers 14, 16 and 17, respectively. A reference signal source indicated at 18 is coupled to control transformers 14, 16, 17 and gate 19. Multi-vibrator 21 is coupled to binary counter 22, which in turn is coupled to binary counter 23, which again in turn is coupled to binary counter 24. The outputs of binary counters 22, 23 and 24 are coupled through resistor matrix 26 to gates 19, 27, 28 and 29. The outputs of control transformers 14, 16 and 17 are coupled to gates 27, 28 and 29, respectively. The outputs of gates 19, 27, 28 and 29 are all coupled to recorder 31.

Playback amplifier 32 is coupled through negative clipper 33 to threshold gate 34, pulse shaper 36, and playback gates 37, 38, 39 and 41. The output of pulse shaper 36 is coupled to binary counter 42, which in turn is connected to binary counter 43. The output of threshold gate 34 is coupled through pulse shaper 44 to binary counters 42 and 43. The outputs of binary counters 42 and 43 are coupled through resistor matrix 46 to playback gates 37, 38, 39 and 41. Playback gates 37, 38, 39 and 41 are connected to recycling detectors 47, 48, 49 and 51. The outputs of recycling detector 47 is connected to servos 52, 53 and 54. The outputs of recycling detectors 48, 49, and 51 are connected to resolvers 56, 57 and 58, respectively. The mechanical outputs of resolver 56 and servo 52 are ganged together and mechanically coupled to shaft 11A. The mechanical outputs of resolver 57 and servo 53 are mechanically ganged and mechanically coupled to shaft 12A. The mechanical outputs of resolver 58 and servo 54 are mechanically ganged and mechanically coupled to shaft 13A.

The waveforms shown graphically in FIG. 2 will be described in relationship to the operation of the block diagram of FIG. 1.

Figure 3:
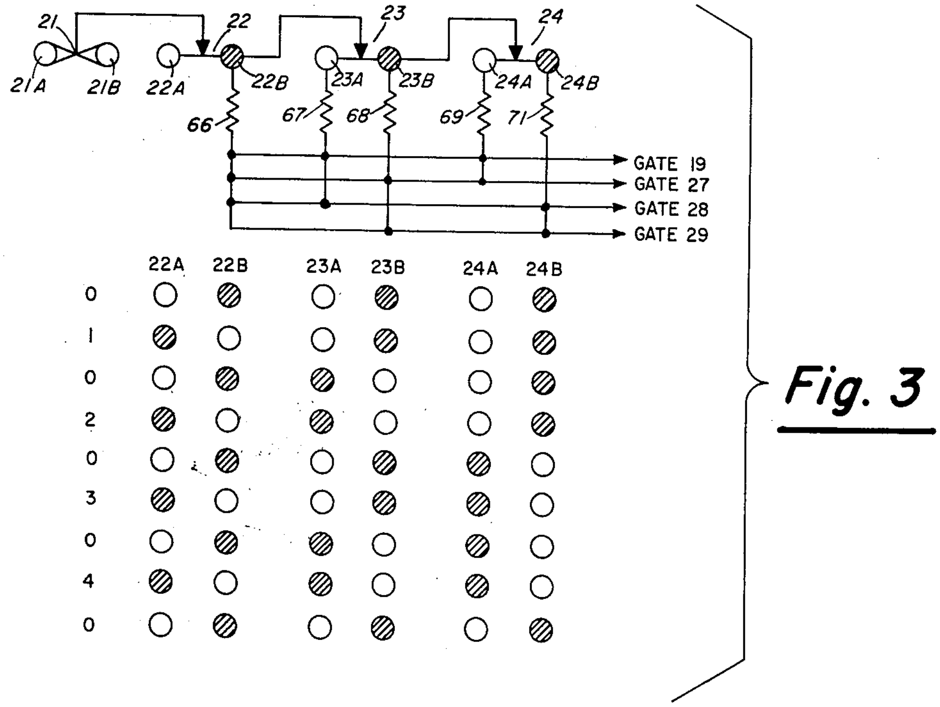
FIG. 3 is a more detailed and tabled representation of the operation of the multi-vibrator and binary counters of FIG. 1.

Referring to FIG. 3 there is shown free-running multivibrator 21 and binary counters 22, 23 and 24. Binary counters 22, 23 and 24 are bi-stable multivibrators having stages 22A, 22B, 23A, 23B, 24A and 24B, respectively. Output resistor matrix 26 of FIG. 1 is shown as resistors 66, 67, 68, 69 and 71, respectively, connected to stages 62B, 63A, 63B, 64A and 64B, respectively. The dot chart in conjunction with the circuit of FIG. 3 is for the purpose of illustrating the various conditions of the binary counter of FIG. 3 and will be explained in detail.

Figure 4:
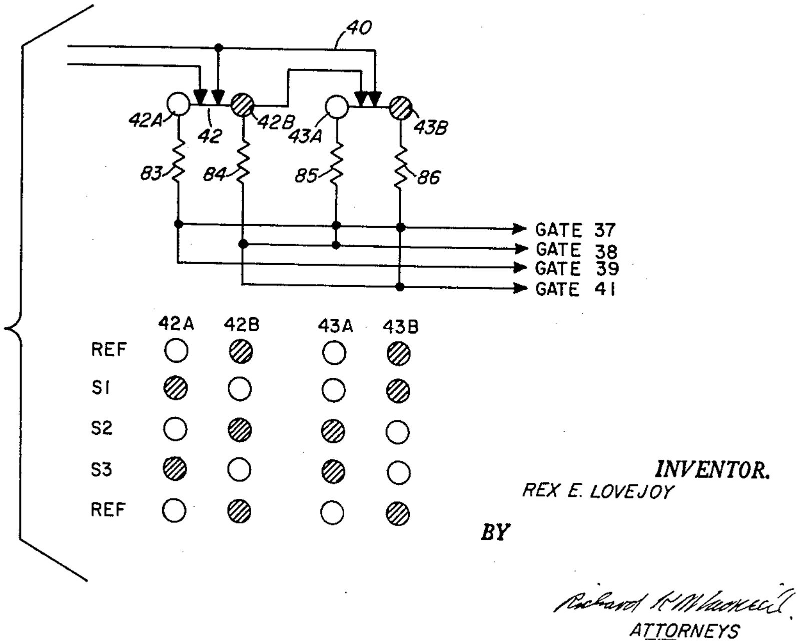
FIG. 4 is a more detailed schematic and tabled representation of the operation of the playback binary counters of FIG. 1.

Referring to FIG. 4 the playback binary counters 42 and 43 are shown in more detail schematically and in conjunction with another dot chart. Binary counters 42 and 43 are shown as bi-stable multivibrators consisting of stages 42A and 42B and bi-stable multivibrator 43 consisting of stages 43A and 43B. Resistors 83, 84, 85 and 86 are connected to stages 42A, 42B, 43A and 43B, respectively, and make up the resistor matrix shown as 46 in FIG. 1.

Figure 5:
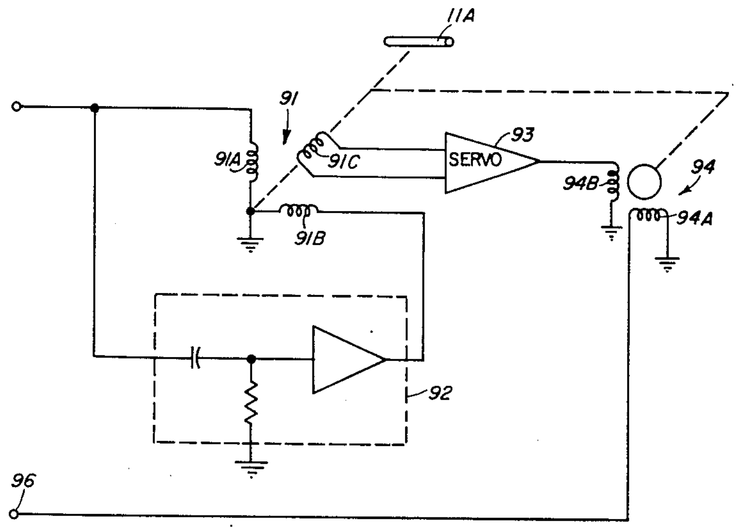
FIG. 5 is a further breakdown of one resolver-servo system of FIG. 1.

Referring to FIG. 5 there is shown a further breakdown of one resolver-servo combination of FIG. 1. The resolver is shown as transformer 91 with phase shift network 92. The secondary of transformer 91 shown at 91C is coupled to the input of servo amplifier 93 the output of which is coupled to winding 94B of two-phase motor 94. The other winding 94A of two-phase motor 94 is coupled to the reference signal recycling detector at terminal 96. The mechanical output of two-phase motor 94 is mechanically ganged to secondary 91C of transformer 91 and to output shaft 11A.

*Operation*

Referring back to FIG. 1, the operation of the system will now be described in detail. The rotational shaft data to be recorded for future reproduction is represented by the shaft positions of shafts 11, 12 and 13. These are mechanically coupled to control transformers 14, 16, and 17, and, by virtue of a reference A.C. signal coupled through the control transformers from reference source 18, converts the rotational position of the shafts into electrical phase shift data as is well known and conventional in the art. The outputs from control transformers 14, 16 and 17 will then be three different A.C. signals related in phase to the reference source 18 and to each other in proportion to the positions of shafts 11, 12 and 13. These outputs are coupled to the inputs of gates 27, 28 and 29. The reference source 18 is coupled to the input of gate 19. In order for the four signals i.e., the reference signal 18 and the outputs of the control transformers 14, 16 and 17 to be simultaneously recorded on a single track, it is necessary to gate gates 19, 27, 28 and 29 sequentially i.e., at any one time only one output will be present from all four gates. This is accomplished by free-running multi-vibrator 21 and binary counters 22, 23 and 24 the outputs of which are coupled through resistor matrix 26 to the gating inputs of gates 19, 27, 28 and 29. The gating operation will be explained in detail with reference to FIG. 3.

Figure 2:
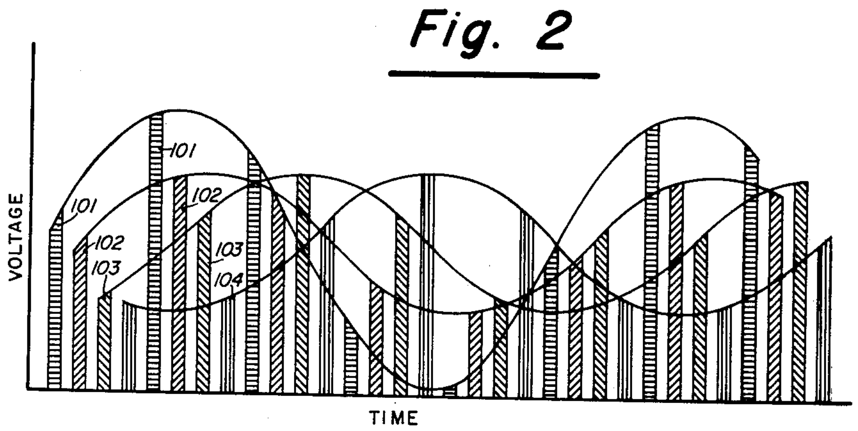
FIG. 2 is a graphical representation of the inputs to the recorder of FIG. 1.

Referring to FIG. 2 the outputs of gates 19, 27, 28 and 29 are shown as waveforms 101, 102, 103 and 104, respectively. It is here noted and emphasized that there is a space between each gated output, and the reference signal which is indicated at 101 is of higher amplitude than any of the shaft signals. These pulses are then recorded on recorder 31 as a series of amplitude modulated pulses.

The impedance of the playback head coil of recorder 31 effectively differentiates the square pulses producing both positive and negative pulses. These differentiated pulses are amplified in playback amplifier 32 and pass through negative clipper 33 which eliminates the negative pulses. The output of negative clipper 33 is passed to playback gates 37, 38, 39 and 41 as the signal input to these gates. This output is also passed through the pulse shaper 36 to trigger binary counter 42, which in turn, triggers binary counter 43. A third output from negative clipper 33 is passed through threshold gate 34 and pulse shaper 44 to, also, trigger binary counters 42 and 43. As was previously emphasized, the referene signal is recorded at a higher level than the signals from control transformers 14, 16 and 17. Threshold gate 34 is designed to reject all but the peaks from reference signal 18. It is further emphasized that the sampling or gating frequency from multi-vibrator 21 and binary counter 22, 23 and 24 is not harmonically related to the reference frequency 18. Thus, in a very short time a pulse will be passed through threshold gate 34 and pulse shaper 44 to trigger binary counters 42 and 43. The purpose of this is to insure the outputs from binary counters 42 and 43 will be in proper phase relationship or in step with the inputs to gates 37, 38, 39 and 41 i.e., gate 37 is gated through resistor matrix 46 at the same time a pulse enters gate 37 from negative clipper 33 representing reference signal 18. This will be further explained with reference to FIG. 4.

At this time, the outputs of gates 37, 38, 39 and 41 will be representative of the pulses recorded from reference signal 18, control transformers 14, 16 and 17, respectively, and are coupled to the signal inputs of recycle detectors 47, 48, 49 and 51, respectively. Recycling detectors 47, 48, 49 and 51 can receive their gate pulse from the gate inputs to gates 37, 38, 39 and 41 i.e., from resistor matrix 46 as will be understood by those skilled in the art. The outputs of recycle detectors 48, 49 and 51 are coupled to the inputs of resolvers 56, 57, and 58, respectively. The output of recycling detector 47 which represents the reference signal is coupled to servos 52, 53 and 54. The outputs of resolvers 56, 57 and 58 are then compared with the reference signals in servos 52, 53 and 54, respectively, and the outputs of the resolver-servo of each resolver servo system are coupled to shafts 11A, 12A and 13A which will reproduce the shaft positions of input shaft 11, 12 and 13 respectively. The operation of the resolver-servo systems will be explained in detail with reference to FIG. 5.

All of the other blocks, e.g., control transformers, gates, negative clipper, threshold gate, pulse shaper, and recycling detectors are well known and conventional in the electronics arts and a further description is deemed unnecessary. These circuits can all be located, for example, in the Radiation Laboratory Series.

Referring now to FIG. 3 there is shown symbolically and schematically free-running multivibrator 21 and binary counters 22, 23 and 24. The binary counters in the preferred embodiment are bi-stable multivibrators. Each stage of each multivibrator is represented by a small circle with one circle of the binary counter multivibrators being shaded to indicated conduction in that stage. Located directly beneath the schematic representation are a series of dots again representing each stage of binary counters 22, 23 and 24 and again shaded to show conduction in one stage. Each row represents the conductive state of the binary counters during each binary count, the first row will be 0, the second row a 1 count, the third row 0, the fourth row a 2 count, the fifth row 0, the sixth row a 3 count, the seventh row 0, the eighth row a 4 count, and then back to the first 0 state. The one, two, three and four conditions trigger gates 19, 27, 28 and 29, respectively. Gates 19, 27, 28 and 29 are set to turn on or gate whenever the outputs of binary counters 22, 23 and 24 which are connected to an individual gate through resistor matrix 26 are taken from the non-conducting stages of the binary counters. Thus, in the first row which is a 0 state, the outputs to reference line gate 19 and the outputs to gates 27, 28 and 29 would not trigger any of the gates because one or more of the feeding resistors are tied to conducting stages. In a next condition binary counter 22 is triggered by multivibrator 21 resulting in its condition being reversed, and the reference gate 19 receiving its trigger. This is then defined as a one output. The following cycle from multivibrator 21 reverses the status of binary counter 22 which in turn reverses the status of binary counter 23 resulting again in a 0 condition. The following pulse cycle from multivibrator 21 again reverses binary counter 22 the output of which does not result in a shift of binary counter 23 since it is in the opposite direction as previously. The following pulse which will be a 0 pulse again reverses the binary counter 22 which this time reverses the condition again of binary counter 23 reversing the condition of binary counter 24. This will then result in another 0 pulse since all of the outputs to any one gate will not be tied to non-conducting stages of the binary counters. The complete cycle of operation can thus be readily seen by following the various states of conduction from each cycle of multivibrator 21 and the resistor matrix hookup to each of the stages of binary counters 22, 23 and 24.

At this point it will be obvious that the gates will sequentially receive a gating signal with a 0 or non-gating condition in between each gate pulse. The alternate off position or non-gate condition is utilized to completely isolate each of the signals from each other. It is emphasized here that the rate of multivibrator 21 must result in a sampling of each of the signals at least twice per cycle and of course must not be an even integral or must bear no harmonic relationship to the reference signal.

Referring to FIG. 4 the same symbolic representation of binary counters 42 and 43 is utilized for explanatory purposes. Thus, binary counters 42 and 43 are represented by small circles 42A, 42B, 43A and 43B, respectively. Adding resistors 83, 84, 85 and 86 sum the outputs from the various stages as did summing resistors 66, 67, 68, 69 and 71 of FIG. 3. Since no blank spots are necessary on the reconstruction or playback gating only four conditions are necessary i.e., one for the reference signal and one for each of the input variables. In this case the playback gates 37, 38, 39 and 41 are set to be gated whenever the associated resistors in resistor matrix 46 are tied to two non-conducting stages. The operation can now be readily seen from FIG. 4. A second trigger input line is shown at 40 which comes out of pulse shaper 44. This is necessary to insure that the reference gate 37 is gated at the same time a signal representing the reference signal is played back. This is accomplished by allowing only the stronger reference pulse to pass through threshold gate 34, and, after shaping in pulse shaper 44, is allowed to force-trigger both binary counters 42 and 43 to the reference condition which is the condition shown. The reference trigger is thus made not only larger in amplitude than the output triggers of pulse shaper 36, but larger in duration to override any simultaneous triggering condition. This last feature further emphasizes the necessity of having no harmonic relationship between the free-running multivibrator 21 and the reference signal frequency, since, if one were a harmonic of the other, the gating of the reference signal may never occur at an amplitude large enough to pass through threshold gate 34.

Referring now to FIG. 5 there is seen resolver-transformer 91, and servo amplifier 93 with its associated two-phase motor 94. As is well known in the art, two-phase motor 94 will only be excited by signals 90° out of phase in each winding, and will turn in a direction dependent upon the phase relationship i.e., the lead or lag of one winding to the other. The signal from recycling detector 47 i.e., the reference signal, is passed into the reference winding of two phase motor 94A. The signal from another recycle detector, in this case 48, is passed through resolver 91, with an unshifted signal being fed to winding 91A and a 90° shifted signal passed through 91B. The output of resolver 91 is taken in winding 91C, the phase of which will depend upon the physical relationship or positioning of winding 91C to primary windings 91A and 91B. This signal is then amplified in servo-amplifier 93 and applied to winding 94B of two-phase motor 94. Depending then upon the phase in winding 94B, two-phase motor 94 will rotate in one direction, and since it is mechanically ganged to secondary winding 91C of transformer 91, it will rotate transformer winding 91C until the coupling between 91A and 91B and 91C cancels, resulting in a 0° output in winding 94B, and the system will come to rest. The rotating parts here are of course mechanically coupled to output shaft 11A, and will result in the output shaft 11A being rotated to the same relative position as input shaft 11. Only one servo system has been shown here since they are all identical.

Obviously many modifications and variations of the present invention are possible in the light of the above teachings. It is therefore to be understood that within the scope of the appended claims the invention may be practiced otherwise than as specifically described.

What is claimed is:

1. A multiplex recording and playback system for recording and reproducing the positions of a plurality of shafts comprising a reference A.C. signal source, a plurality of phase transducers each adapted to convert positions of a plurality of shafts into a plurality of A.C. signals of lower amplitudes than said reference signal, said low amplitude signals having phase relationships to said reference signal dependent upon the individual shaft position thereof, a plurality of gate means each having a signal input, a signal output, and a gating input, said number of gate means being one more than said number of low amplitude signals, gating signal generating means connected to each of said gate means gating input, said gating signal generating means operable to sequentially gate said plurality of gate means, the outputs of said phase transducers each connected to the signal input of a different one of said gate means, said reference signal source connected to the signal input of the remaining gate means, a single-track recording medium, means connected to each gate means output for recording said gate means outputs on said recording medium, playback means for reproducing said gate means outputs from said recording medium, said playback means having a single output, a plurality of gates including a reference signal gate, each of said gates having a signal input, a signal output and a gating input, said playback means output connected to all of said gate signal inputs, a gating signal generator connected to each of said gating inputs, synchronizing means connected to said gating signal generating means with said reference signal whereby said reference signal gate is gated upon whenever a reference signal appears at the output of said recording means, a plurality of detecting means each connected to the output of a separate one of said detecting means, a plurality of resolver means each connected to the output of a different one of said detecting means and to said reference signal detecting means, and a plurality of shaft driving means each connected to the output of a different one of said resolver means.

2. The system of claim 1 wherein said gating signal generating means comprises a pulse generator having an output, a counter having an input and a plurality of outputs, said number of outputs equal to said number of gate means, said counter input connected to said output of said pulse generator and said outputs of said counter connected to said gating inputs, respectively.

3. A multiplex recording system for recording positions of a plurality of shafts comprising a reference A.C. signal source, a plurality of phase transducers each adapted to convert positions of a plurality of shafts into a plurality of A.C. signals of lower amplitude than said reference signal, said signals of low amplitude having a phase relationship to said reference signal dependent upon the indvidual shaft position thereof, a plurality of gate means each having a signal input, a signal output and a gating input, said number of gate means being one more than said number of low amplitude signals, gating signal generating means connected to each of said gate means gating input, said gating signal generating means operable to sequentially gate said plurality of gate means, the outputs of said phase transducers each connected to the signal input of a different one of said gate means, said reference signal source connected to said signal input of said remaining gate means, single track recording means, the outputs of all of said gate means connected to said recording means for recording all of said gate means outputs on a single track.

4. The system of claim 3 wherein said gating signal generating means comprises a pulse generator having an output, a counter having an input and a plurality of outputs, said number of outputs equal to said number of gate means, said counter input being connected to said output of said pulse generator and said outputs of said counter connected to said gating inputs, respectively.

5. Multiplex playback means for reproducing a series of sequentially recorded signals on a single recording track, said signals including a reference signal and a plurality of analog intelligence signals of a smaller amplitude than said reference signals, said intelligence signals having a phase relationship to said reference signal proportional to positions of a plurality of shafts, comprising a plurality of playback gate means including a playback reference signal gating means, each having a signal input, a signal output and a gating input, a single recorded track connected for playback to all of said playback gating means signal input, playback gating signal generating means connected to each of said playback gate means gating input, synchronizing means connected to said gating signal generating means for synchronizing said gating signal generating means with said reference signal whereby said reference signal gating means is gated upon whenever a reference signal appears at the output of said recorder, a plurality of detecting means each connected to the output of a separate one of said detecting means, a plurality of resolver means each connected to the output of a different one of said detecting means and to said reference signal detecting means, and a plurality of shaft driving means each connected to the output of a different one of said resolver means.

6. The system of claim 5 wherein said playback gating signal generating means comprises a counter having an input and a plurality of outputs, said number of outputs equal to said number of gating inputs, said input of said counter coupled to said synchronizing means, and said counter outputs coupled to said gating inputs, respectively.

7. The system of claim 1 wherein said playback gating signal generator comprises a counter having an input and a plurality of outputs, said number of outputs equal to said number of gating inputs, said input of said counter coupled to said synchronizing means, and said counter outputs coupled to said gating inputs, respectively.

8. The system of claim 7 wherein said synchronizing means comprises a threshold gate having a predetermined threshold level, said threshold gate having an input connected to the output of said recording means and an output coupled to said counter input, and said threshold gate operable to pass only said reference signal.

9. The system of claim 6 wherein said synchronizing means comprises a threshold gate having a predetermined threshold level, said threshold gate having an input connected to the output of said single recorded track and an output connected to said counter input, and said threshold gate operable to pass only said reference signal.

10. Telemetering receiving apparatus for interpreting a series of time-multiplexed analog signals, said signals including a plurality of information signals and a reference signal, comprising a threshold gate having an input and an output, said gate being sensitive to and passing only said reference signal, a plurality of gates having a signal input, a signal output and a gating trigger input, said number of gates being one greater than the number of information signals, means for coupling said signal inputs of said gates to said input of said threshold gate, means coupled to said input of said threshold gate, said output of said threshold gate and to said gating trigger inputs of said gates for sequentially triggering said gates, and means coupled to said signal outputs of said gates for sequentially comparing the phase of said reference signal to the phase of each of said information signals.

References Cited in the file of this patent

UNITED STATES PATENTS

| | | |
|---|---|---|
| 2,668,283 | Mullin | Feb. 2, 1954 |
| 2,685,079 | Hoeppner | July 27, 1954 |
| 2,828,482 | Schumann | Mar. 25, 1958 |
| 2,970,302 | Gridley | Jan. 31, 1961 |